（12） United States Patent
Parnin

(10) Patent No.: US 10,145,276 B2
(45) Date of Patent: Dec. 4, 2018

(54) LUBRICANT VALVE MONITORING METHOD AND ASSEMBLY

(71) Applicant: United Technologies Corporation, Hartford, CT (US)

(72) Inventor: Francis Parnin, Suffield, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 338 days.

(21) Appl. No.: 14/747,214

(22) Filed: Jun. 23, 2015

(65) Prior Publication Data

US 2016/0376949 A1    Dec. 29, 2016

(51) Int. Cl.
| | |
|---|---|
| *G01M 15/14* | (2006.01) |
| *F01M 11/10* | (2006.01) |
| *F01D 25/18* | (2006.01) |
| *F16N 29/00* | (2006.01) |
| *F16H 57/04* | (2010.01) |

(52) U.S. Cl.
CPC ............ *F01M 11/10* (2013.01); *F01D 25/18* (2013.01); *F16N 29/00* (2013.01); *G01M 15/14* (2013.01); *F16H 57/0442* (2013.01); *F16N 2270/60* (2013.01); *F16N 2280/00* (2013.01)

(58) Field of Classification Search
CPC .............................. G01M 15/14; F01M 11/10
USPC ........................................................ 73/112.01
See application file for complete search history.

(56) References Cited

U.S. PATENT DOCUMENTS

| | | | |
|---|---|---|---|
| 7,387,189 B2 | 6/2008 | James et al. | |
| 7,662,059 B2 | 2/2010 | McCune | |
| 7,849,668 B2 | 12/2010 | Sheridan | |
| 8,230,974 B2 | 7/2012 | Parnin | |
| 8,800,720 B2 | 8/2014 | Motto | |
| 8,813,469 B2 | 8/2014 | Sherdian | |
| 2008/0182709 A1* | 7/2008 | Hart | .......... F16H 57/0434 476/8 |
| 2010/0025158 A1 | 2/2010 | Allam | |
| 2012/0024631 A1 | 2/2012 | Delamour et al. | |
| 2012/0324899 A1 | 12/2012 | DiBenedetto et al. | |
| 2014/0150439 A1 | 6/2014 | Parnin et al. | |

(Continued)

FOREIGN PATENT DOCUMENTS

WO    2015076903    5/2015

OTHER PUBLICATIONS

European Search Report for Application No. 16173769.7 dated Sep. 16, 2016.

*Primary Examiner* — Peter Macchiarolo
*Assistant Examiner* — Alexander Mercado
(74) *Attorney, Agent, or Firm* — Carlson, Gaskey & Olds, P.C.

(57) ABSTRACT

An exemplary method of monitoring a position of a lubricant valve in a gas turbine engine includes monitoring a position of a lubricant valve using a first auxiliary pressure reading and a second auxiliary pressure reading. The first auxiliary pressure reading is taken when a primary lubrication circuit is at a first pressure. The second auxiliary pressure reading is taken when the primary lubrication circuit is at a second pressure. An exemplary assembly that detects transitions of a lubricant valve in a gas turbine engine includes a controller that uses readings of the primary pressure and readings of the auxiliary pressure to detect a position of a lubricant valve.

19 Claims, 5 Drawing Sheets

(56) References Cited

U.S. PATENT DOCUMENTS

2014/0271118 A1 9/2014 Junod
2016/0215652 A1* 7/2016 Mastro ...................... F02C 7/32

* cited by examiner

150# LUBRICANT VALVE MONITORING METHOD AND ASSEMBLY

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow that is expanded through the turbine section to drive the compressor section and the fan section. The compressor section typically includes low and high pressure compressors, and the turbine section includes low and high pressure turbines.

A speed reduction device, such as an epicyclical gear assembly, can be utilized to drive the fan section. The speed reduction device permits the fan section to rotate at a speed different than the turbine section, which can increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

The epicyclical gear assembly requires lubrication to prevent premature wear of bearing surfaces. A primary lubrication subsystem that includes a main pump and main reservoir can provide lubrication to the bearing surfaces during engine operation. An auxiliary lubrication subsystem can utilize lubricant drained from the gear assembly to maintain lubricant flow to the bearing surfaces. The auxiliary lubrication subsystem is typically used when the primary lubrication subsystem is not able to provide sufficient lubricant to the bearing surfaces.

The primary lubrication subsystem may not be able to provide sufficient lubricant to the bearing surfaces when the engine is not operating, or is operating at a relatively low speed. The bearing surfaces can still require lubrication in this situations due to, for example, airflow through the fan section causing the gear assembly to rotate. Also, certain maneuvers with the engine operating may briefly interrupt the operation of the primary lubrication subsystem.

SUMMARY

A method of monitoring a position of a lubricant valve in a gas turbine engine according to an exemplary aspect of the present disclosure includes, among other things, monitoring a position of a lubricant valve using a first auxiliary pressure reading and a second auxiliary pressure reading. The first auxiliary pressure reading is taken when a primary lubrication circuit is at a first pressure. The second auxiliary pressure reading is taken when the primary lubrication circuit is at a second pressure.

In a further non-limiting embodiment of the foregoing method, the first pressure is different than the second pressure.

In a further non-limiting embodiment of any of the foregoing methods, the first auxiliary pressure reading and the second auxiliary pressure reading are readings of pressure in an auxiliary lubrication circuit.

In a further non-limiting embodiment of any of the foregoing methods, the lubricant valve is moveable from a primary position and to an auxiliary position, and moveable from the auxiliary position to the primary position. The lubricant valve in the primary position permits a fluid to communicate along the primary lubrication circuit to a gearbox. The lubricant valve in the auxiliary position permits a fluid to communicate along the auxiliary lubrication circuit to the gearbox.

In a further non-limiting embodiment of any of the foregoing methods, a difference between the first auxiliary pressure reading and the second auxiliary pressure reading that meets or exceeds a threshold value indicates that the lubricant valve has moved from the primary position to the auxiliary position, or from the auxiliary position to the primary position.

In a further non-limiting embodiment of any of the foregoing methods, the lubricant valve in the primary position blocks the fluid from communicating along the auxiliary lubrication circuit to the gearbox, and the lubricant valve in the auxiliary position blocks the fluid from communicating along the primary lubrication circuit to the gearbox.

In a further non-limiting embodiment of any of the foregoing methods, the method includes using a pressure differential to transition the lubricant valve from the primary position to the auxiliary position, and from the auxiliary position to the primary position.

In a further non-limiting embodiment of any of the foregoing methods, the method includes selectively lubricating a portion of a geared architecture of a gas turbine engine using fluid communicated along the primary lubrication circuit or an auxiliary lubrication circuit.

In a further non-limiting embodiment of any of the foregoing methods, the portion of the geared architecture comprises bearing surfaces of journal bearings within the geared architecture.

An assembly that detects positions of a lubricant valve in a gas turbine engine according to an exemplary aspect of the present disclosure includes, among other things, a primary sensor that monitors a primary pressure in a primary lubrication circuit extending from a primary source to a gearbox, an auxiliary sensor that monitors an auxiliary pressure in an auxiliary lubrication circuit extending from an auxiliary source to the gearbox, and a controller that uses readings of the primary pressure and readings of the auxiliary pressure to detect a position of a lubricant valve.

In a further non-limiting embodiment of the foregoing assembly, the lubricant valve is a shuttle valve.

In a further non-limiting embodiment of any of the foregoing assemblies, the lubricant valve is moveable back and forth between a primary position and an auxiliary position. The lubricant valve in the primary position permits a fluid to communicate along the primary lubrication circuit to the gearbox. The lubricant valve in the auxiliary position permits a fluid to communicate along the auxiliary lubrication circuit to the gearbox.

In a further non-limiting embodiment of any of the foregoing assemblies, the lubricant valve is configured to transition back and forth between a primary position and a secondary position in response to a pressure in the primary lubrication circuit.

In a further non-limiting embodiment of any of the foregoing assemblies, the primary lubrication circuit and the auxiliary lubrication circuit selectively communicate a lubricant to a portion of a gas turbine engine.

In a further non-limiting embodiment of any of the foregoing assemblies, the portion is within a geared architecture.

In a further non-limiting embodiment of any of the foregoing assemblies, the portion comprises bearing surfaces of journal bearings.

In a further non-limiting embodiment of any of the foregoing assemblies, the controller uses readings of the primary pressure and readings of the auxiliary pressure to detect whether the lubricant valve has transitioned to a primary position that permits flow along the primary lubrication circuit to a geared architecture or to a secondary position that permits flow along the auxiliary lubrication circuit to the geared architecture.

In a further non-limiting embodiment of any of the foregoing assemblies, the controller is configured to compare a first auxiliary pressure reading taken when the primary pressure is at a first value to a second auxiliary pressure reading taken when the primary pressure is at a second value.

In a further non-limiting embodiment of any of the foregoing assemblies, the controller is configured to infer that the valve has transitioned between a primary position and a secondary position based on a difference between the first auxiliary pressure reading and the second auxiliary pressure reading.

DESCRIPTION OF THE FIGURES

The various features and advantages of the disclosed examples will become apparent to those skilled in the art from the detailed description. The Figures that accompany the detailed description can be briefly described as follows.

DETAILED DESCRIPTION

Figure 1:
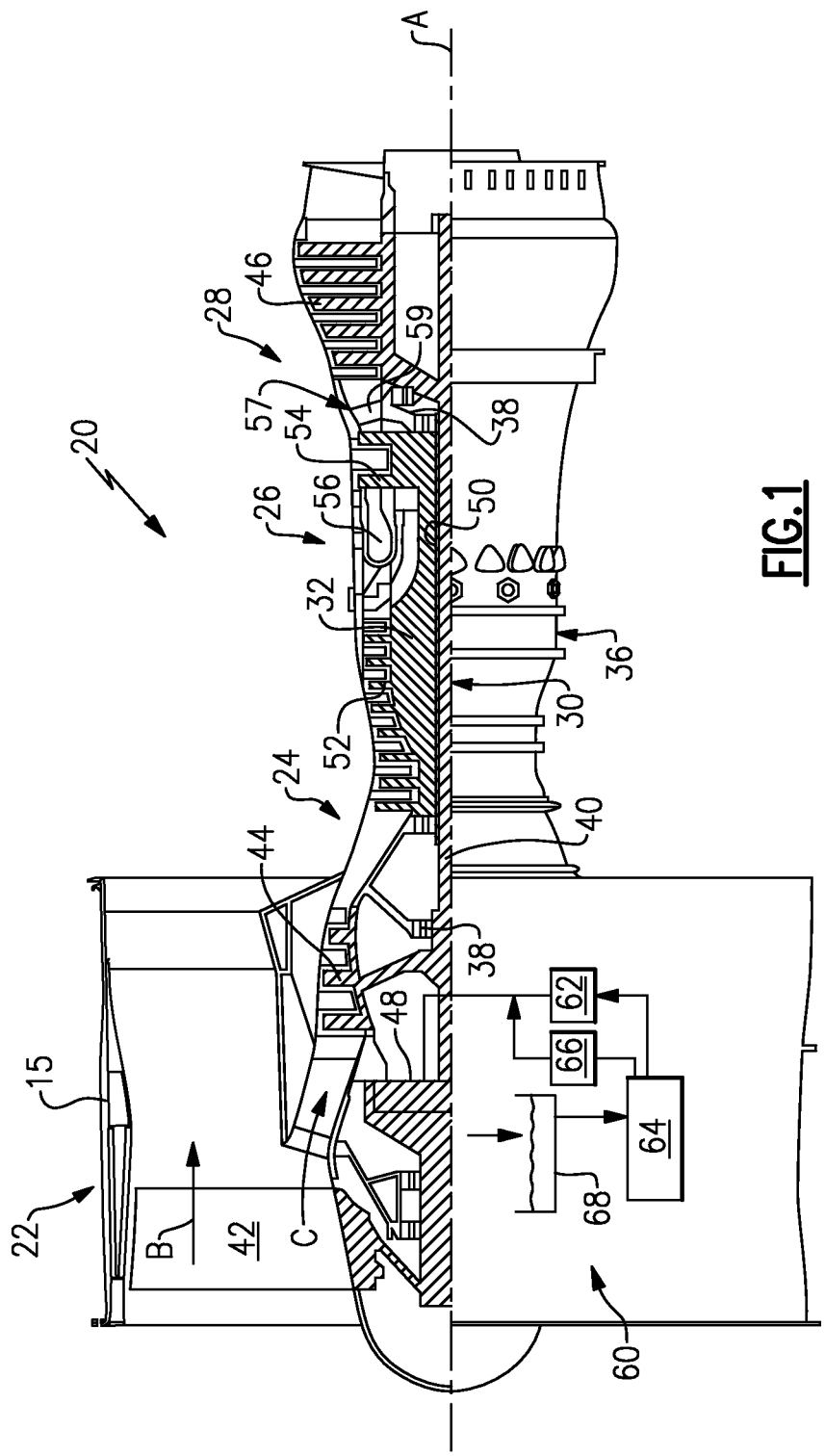
FIG. 1 illustrates a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26, and a turbine section 28.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }°R)/(518.7°R)]^{0.5}$. The "Low corrected fan tip speed" as disclosed herein according to one non-limiting embodiment is less than about 1150 ft/second.

The gas turbine engine 20 includes a lubrication system 60 to provide lubrication to at least one bearing surface of the geared architecture 48. The example lubrication assembly includes a primary lubrication subsystem and an auxiliary lubrication subsystem.

The primary lubrication subsystem provides lubricant flow to the bearing surface during normal operation. In some instances, the engine 20 may not be operating or may be operating at a condition where lubricant flow through the primary lubrication subsystem is not providing lubricant flow above a desired threshold value. The auxiliary lubrication subsystem is then utilized to supplement lubricant flow during engine operating conditions where the primary lubrication subsystem is not providing sufficient flow.

This lubricant can be oil or some other fluid appropriate for lubricating the bearing surfaces.

The primary lubrication subsystem includes at least a primary pump 62 that draws lubricant from a main lubricant reservoir 64 to provide lubricant flow to the geared architecture 48 during operation of the engine 20.

The auxiliary lubrication subsystem includes at least an auxiliary pump 66 that draws lubricant from a gutter 68. The gutter 68 captures lubricant that is exhausted from other bearing assemblies or the geared architecture 48 as is shown schematically in FIG. 1.

Figure 2:
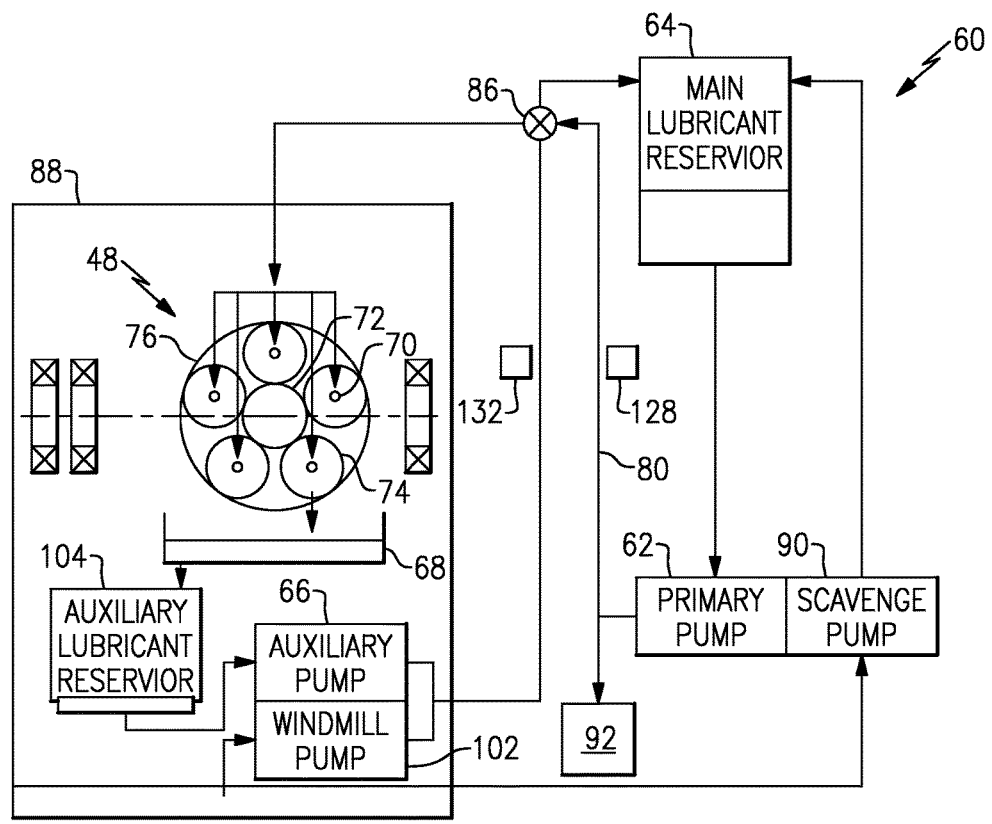
FIG. 2 illustrates a schematic view of an example lubrication system for a fan drive gear system from the engine of FIG. 1 during operation of a primary lubrication subsystem.
Figure 3:
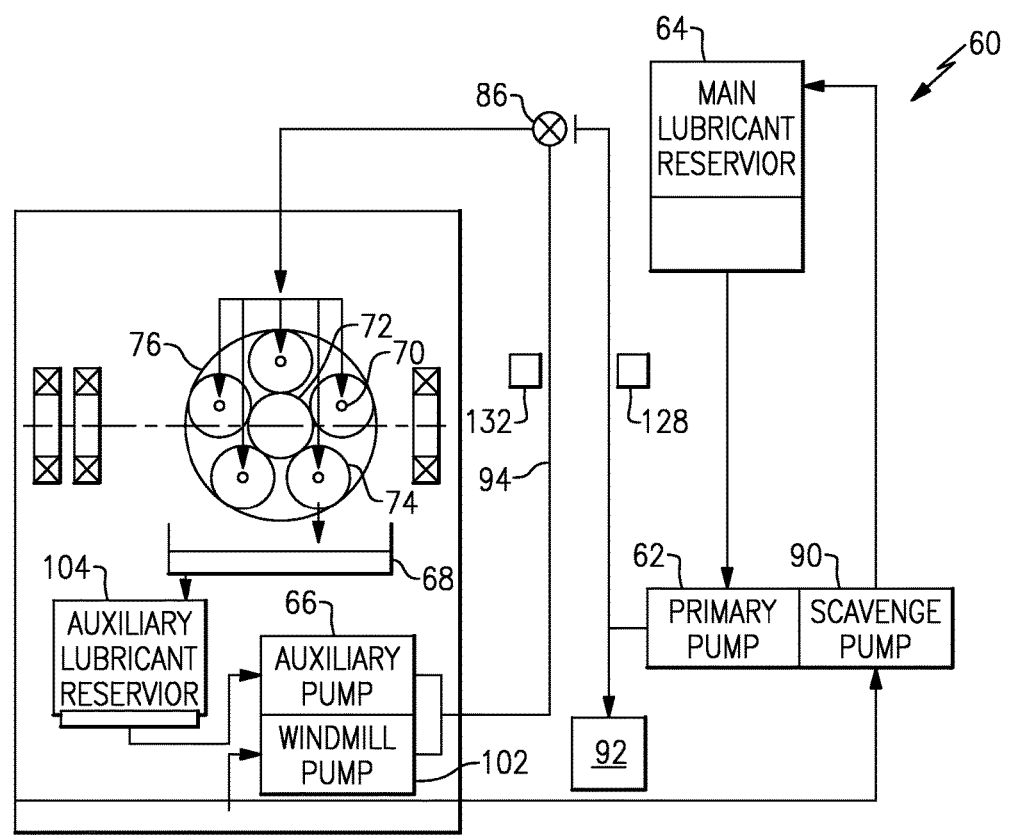
FIG. 3 illustrates a schematic view of the lubrication system of FIG. 2 during operation of an auxiliary lubrication subsystem.

Referring now to FIGS. 2 and 3, the lubrication system 60 provides lubricant to the geared architecture 48 and specifically to bearing surfaces of journal bearings 70 within the geared architecture 48. It should be understood that although lubrication of bearing surfaces within the geared architecture 48 are disclosed by way of example, other systems of the engine 10 that can require lubrication are within contemplation of this disclosure. For example, other roller bearings that support a windmilling fan could be lubricated in some examples of the lubrication system 60. Further, gearboxes within rotary-wing aircraft could be lubricated in some examples of the lubrication system 60.

In this example, the geared architecture 48 includes a sun gear 72 that drives a plurality of intermediate gears 74. The intermediate gears 74 in turn drive a ring gear 76. The intermediate gears 74 are each supported by one of the journal bearings 70.

The journal bearings 70 define bearing surfaces between the intermediate gears 74 and a fixed shaft. Rotation of the intermediate gears 74 upon the bearing surfaces, if not sufficiently lubricated, may have a detrimental effect to operation and result in premature wear. Accordingly, the auxiliary lubrication subsystem is provided to maintain a desired predetermined level of lubricant flow to the bearing surfaces during all engine operating conditions, regardless the amount of lubricant that can be provided by the primary lubrication subsystem.

As shown in FIG. 2, when the primary lubrication subsystem is operating, the lubrication system 60 communicates lubricant to the bearing surfaces along a primary lubrication circuit 80. The primary lubrication circuit 80 extends from the main lubricant reservoir 64, to the primary pump 62, to a lubricant valve 86, and to bearing surfaces of the journal bearings 70. Lubricant from the bearing surfaces is collected within a bearing compartment 88 and returned along the primary lubrication circuit 80 to the main lubricant reservoir 64 with a scavenge pump 90.

The primary lubrication circuit 80 can communicate lubricant to other areas of the engine 20 rather than communicate all lubricant along the path through the lubricant valve 86. The other areas of the engine 20 are schematically represented by a box 92 in FIGS. 2 and 3.

As shown in FIG. 3, when the auxiliary lubrication subsystem is operating, the lubrication system 60 communicates lubricant to the bearing surfaces along an auxiliary lubrication circuit 94. The auxiliary lubrication circuit 94 extends from the auxiliary pump 66 and a windmill pump 102 through the lubricant valve 86 to the bearing surfaces of the journal bearings 70.

Some lubricant from the bearing surfaces then moves along a portion of the auxiliary lubrication circuit 94 to the gutter 68, to an auxiliary lubricant reservoir 104, and back to the auxiliary pump 66.

Some lubricant from the bearing surfaces also moves along another portion of the auxiliary lubrication circuit 94 to a bottom of the bearing compartment 88. This fluid is then drawn moved from the bottom of the bearing compartment 88 by windmill pump 102, combined with fluid from the auxiliary pump 66, and passed along the auxiliary lubrication circuit 94 back to the lubricant valve 86.

Figure 4:
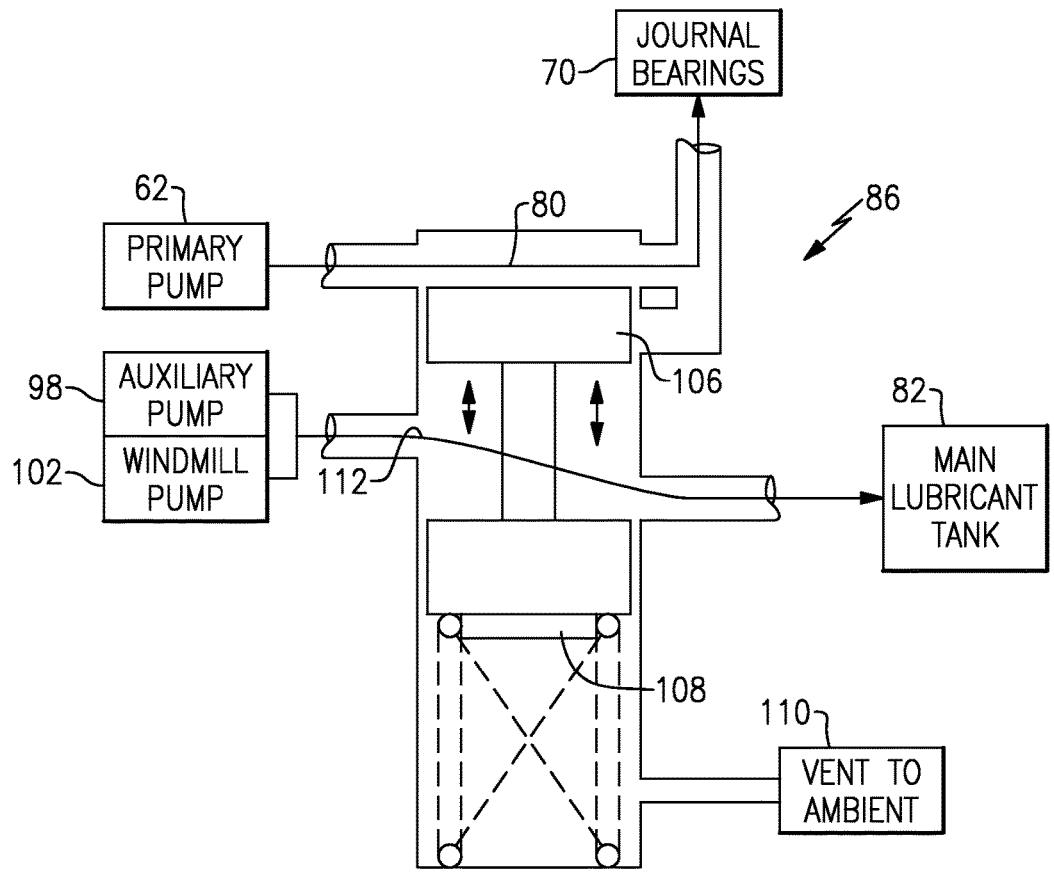
FIG. 4 illustrates a schematic view of an example lubricant valve from the primary and auxiliary lubrication subsystems of FIGS. 2 and 3.

Referring now to FIG. 4 with continuing reference to FIGS. 2 and 3, the lubricant valve 86 is a shuttle valve in this example. The lubricant valve 86 is moveable between a primary position, which permits flow along the primary lubrication circuit 80, and a secondary position, which permits flow along the auxiliary lubrication circuit 94. The positioning of the lubricant valve 86 thus controls whether flow is communicating to the bearing surfaces along the primary lubrication circuit 80 or the auxiliary lubrication circuit 94.

The lubricant valve 86 includes a plunger 106 and a biasing member 108, such as a spring. The lubricant valve 86 further includes a vent to ambient at 110.

FIG. 4 shows the lubricant valve 86 in the primary position. In the primary position, lubricant pressure in the primary lubrication circuit 80 is sufficient to overcome the bias of the biasing member 108 to move the plunger 106 to a position that permits flow along the primary lubrication circuit 80 to move through the lubricant valve 86 from the primary pump 62 to the bearing surfaces of the journal bearings 70. In the primary position, flow from the auxiliary pump 66 and the windmill pump 102 moves along a bypass flowpath 112 through the lubricant valve 86 to the main lubricant reservoir 64.

Lubricant pressure differentials can cause the lubricant valve 86 to transition between the primary and secondary positions. When the lubricant pressure of the primary lubrication circuit 80 is below a threshold lubricant pressure, the lubricant valve 86 stays in the secondary position to permit flow along the auxiliary lubrication circuit 94. When lubricant pressure of the primary lubrication circuit 80 reaches or exceeds the threshold lubricant pressure, the lubricant valve 86 transitions from the secondary position to the primary position to permit flow along the primary lubrication circuit 80 as shown in FIG. 4.

Positioning the lubricant valve 86 in the secondary position to lubricate the bearing surfaces of the journal bearings 70 with fluid moving along the auxiliary lubrication circuit 94 can be required during when first starting the engine 20 and until the engine 20 reaches an operating speed appropriate for raising the lubricant feed pressure within the primary lubrication circuit to a level adequate for lubricating the bearing surfaces.

Monitoring transitions of the lubricant valve 86 between the primary and secondary positions can be difficult. Packaging positional sensors near the lubricant valve 86 can be difficult due to packaging constraints, for example.

During flight, the lubricant valve 86 will ordinarily not transition to the secondary position absent abnormal maneuvers of the engine, such as a negative G or an inflight shut down due to an engine event. Ensuring that the lubricant valve 86 has transitioned between primary and secondary positions can be useful to ensure that the bearing surfaces of the journal bearings 70 are receiving an appropriate supply of lubricant.

Figure 5:
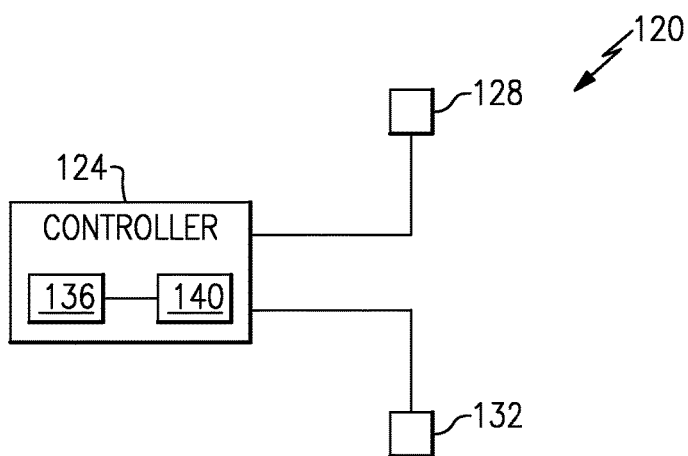
FIG. 5 illustrates a schematic view of an example assembly to detect positions of the lubricant valve of FIG. 4.

Referring now to FIG. 5 with continuing reference to FIGS. 2 to 4, an example lubricant valve monitoring assembly 120 includes at least a controller 124, a primary sensor 128, and a secondary sensor 132. The primary sensor 128 monitors lubricant pressure of the primary lubrication circuit 80 at a position upstream from the lubricant valve 86 and downstream from the primary pump 62. This lubricant pressure is considered a primary lubricant pressure.

The secondary sensor 132 monitors lubricant pressure of the auxiliary lubrication circuit 94 at a position directly upstream from lubricant valve 86 and downstream from both the auxiliary pump 66 and the windmill pump 102. This lubricant pressure is considered an auxiliary lubricant pressure.

The controller 124 can use a measurement of the primary lubricant pressure from the primary sensor 128 and a measurement of auxiliary lubricant pressure from the secondary sensor 122 to detect a position of the lubricant valve 86, and specifically to detect whether or not the lubricant valve 86 has transitioned from the primary position to the secondary position, or from the secondary position to the primary position.

The sensors 128 and 132 could be any type of sensors suitable for measuring a lubricant pressures of the primary lubrication circuit 80 and auxiliary lubrication circuit 94. The controller 124 may be a portion of an on-flight control module, or could be a separate controller devoted specifically to detecting position of the lubricant valve 86.

Many computing devices can be used to implement various functions described herein. The example controller 124 can, for example, include at least a processor 136 and a memory portion 140 for implementing the various functions.

The example processor 136 executes software code, particularly software code stored in the memory portion 140. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory portion 140 can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory portion 140 may include one or more additional or separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

Figure 6:
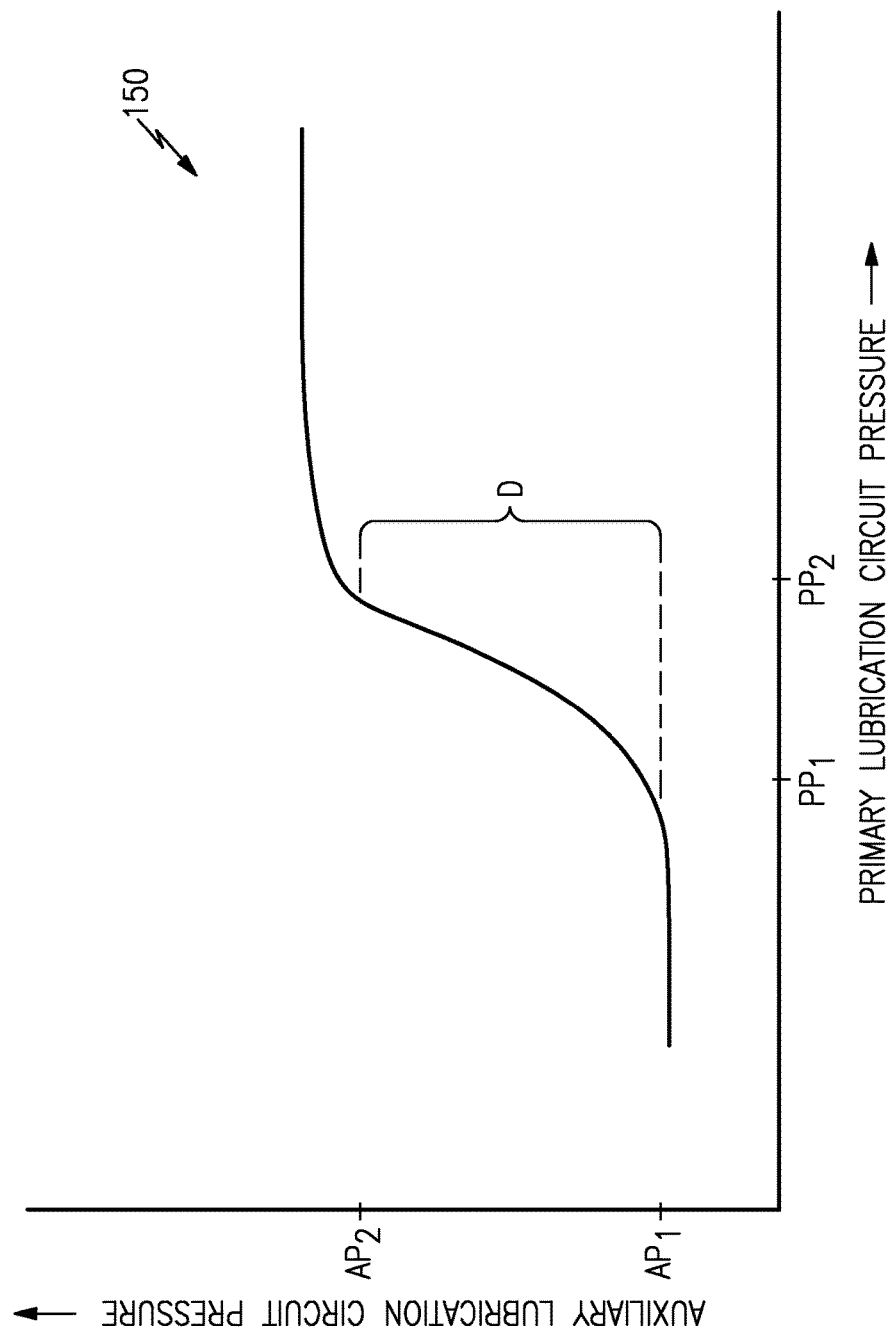
FIG. 6 illustrates a plot of auxiliary lubrication circuit pressure versus primary lubrication circuit pressure over time.

Referring now to FIG. 6 with continuing reference to FIGS. 2 to 5, the controller 124 can be programmed to execute a method of monitoring a position of the lubricant valve 86. A graph 150 shows auxiliary lubricant circuit pressure verses primary lubrication circuit pressure during take-off for example.

In this example, the controller 124 collects a first auxiliary lubricant pressure reading $AP_1$ from the secondary sensor 132 when a primary lubricant pressure reading from the primary sensor 128 indicates that lubricant pressure of the primary lubrication circuit 80 is at a first primary lubricant pressure $PP_1$, say 40 psia.

The controller 124 also collects a second auxiliary lubricant pressure reading $AP_2$ from the secondary sensor 132 when a primary lubricant pressure reading from the primary sensor 128 indicates that lubricant pressure of the primary lubrication circuit 80 is at a second pressure $PP_2$, say 60 psia.

The controller 124 then calculates a difference D between the first auxiliary lubricant pressure reading $AP_1$ and the second auxiliary lubricant pressure reading $AP_2$. If the difference between the first auxiliary lubricant pressure reading $AP_1$ and the second auxiliary lubricant pressure reading $AP_2$ is greater than a threshold pressure, say 8 psia, the controller 124 infers that the lubricant valve 86 has transitioned between the primary and secondary positions.

If, on the other hand, the difference D is below the threshold lubricant pressure, the controller 124 infers that the lubricant valve 86 has become stuck in the primary position or the secondary position. The controller 124 can then initiate an alert, such as illuminating a visual indicator on an in-cabin display. The alert indicates that at least the lubricant valve 86 should be inspected. A person having skill in this art could conceive other appropriate actions in response to a message from the controller 124 inferring that the lubricant sensor 86 is stuck.

Notably, positioning the sensors 128 and 132 within the engine 20 can be relatively easier than introducing an assembly that is located near the lubricant valve 86 and used to determine whether the lubricant valve 86 has actuated between the primary and secondary positions. The secondary sensor 132, for example, could be positioned in many areas along the auxiliary lubrication circuit 94 and provide auxiliary lubricant pressure readings to the controller 124 that enable the controller 124 to calculate whether or not the lubricant valve 86 is actuated between the primary and the secondary positions.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A method of monitoring a position of a lubricant valve in a gas turbine engine, comprising:

monitoring a position of a lubricant valve using a first primary pressure reading, a second primary pressure reading, a first auxiliary pressure reading and a second auxiliary pressure reading, the first auxiliary pressure reading taken when a primary lubrication circuit is at a first pressure obtained by the first primary pressure reading, the second auxiliary pressure reading taken when the primary lubrication circuit is at a second pressure obtained by the second primary pressure reading, wherein the first primary pressure reading and the second primary reading are readings of pressure in the primary lubricant circuit, the first auxiliary pressure reading and the second auxiliary pressure reading are readings of pressure in an auxiliary lubrication circuit, and the lubricant valve includes a first inlet and a second inlet.

2. The method of claim 1, wherein the first pressure is different than the second pressure.

3. The method of claim 1, wherein the lubricant valve is moveable from a primary position and to an auxiliary position, and moveable from the auxiliary position to the primary position, the lubricant valve in the primary position permitting a fluid to communicate along the primary lubrication circuit to a gearbox, the lubricant valve in the auxiliary position permitting a fluid to communicate along the auxiliary lubrication circuit to the gearbox.

4. The method of claim 3, wherein a difference between the first auxiliary pressure reading and the second auxiliary pressure reading that meets or exceeds a threshold value indicates that the lubricant valve has moved from the primary position to the auxiliary position, or from the auxiliary position to the primary position.

5. The method of claim 3, wherein the lubricant valve in the primary position blocks the fluid from communicating along the auxiliary lubrication circuit to the gearbox, and the lubricant valve in the auxiliary position blocks the fluid from communicating along the primary lubrication circuit to the gearbox.

6. The method of claim 3, further comprising using a pressure differential to transition the lubricant valve from the primary position to the auxiliary position, and from the auxiliary position to the primary position.

7. The method of claim 1, further comprising selectively lubricating a portion of a geared architecture of a gas turbine engine using fluid communicated along the primary lubrication circuit or an auxiliary lubrication circuit.

8. The method of claim 7, wherein the portion of the geared architecture comprises bearing surfaces of journal bearings within the geared architecture.

9. An assembly that detects transitions of a lubricant valve in a gas turbine engine, comprising:
a primary sensor that monitors a primary pressure in a primary lubrication circuit extending from a primary source to a gearbox;
an auxiliary sensor that monitors an auxiliary pressure in an auxiliary lubrication circuit extending from an auxiliary source to the gearbox;
a controller that uses readings of the primary pressure and readings of the auxiliary pressure to detect a position of a lubricant valve; and
wherein the controller is configured to compare a first auxiliary pressure reading taken when the primary pressure is at a first value obtained by a first primary pressure reading and to a second auxiliary pressure reading taken when the primary pressure is at a second value obtained by a second primary pressure reading.

10. The assembly of claim 9, wherein the lubricant valve is a shuttle valve.

11. The assembly of claim 10, wherein the lubricant valve is moveable back and forth between a primary position and an auxiliary position, the lubricant valve in the primary position permitting a fluid to communicate along the primary lubrication circuit to the gearbox, the lubricant valve in the auxiliary position permitting a fluid to communicate along the auxiliary lubrication circuit to the gearbox.

12. The assembly of claim 9, wherein the lubricant valve is configured to transition back and forth between a primary position and a secondary position in response to a pressure in the primary lubrication circuit.

13. The assembly of claim 9, wherein the primary lubrication circuit and the auxiliary lubrication circuit selectively communicate a lubricant to a portion of a gas turbine engine.

14. The assembly of claim 13, wherein the portion is within a geared architecture.

15. The assembly of claim 14, wherein the portion comprises bearing surfaces of journal bearings.

16. The assembly of claim 9, wherein the controller uses readings of the primary pressure and readings of the auxiliary pressure to detect whether the lubricant valve has transitioned to a primary position that permits flow along the primary lubrication circuit to a geared architecture or to a secondary position that permits flow along the auxiliary lubrication circuit to the geared architecture.

17. The assembly of claim 9, wherein the controller is configured to infer that the valve has transitioned between a primary position and a secondary position based on a difference between the first auxiliary pressure reading and the second auxiliary pressure reading.

18. The method of claim 5, wherein the first inlet of the lubricant valve receives the fluid from the primary lubrication circuit and the second inlet of the lubricant valve receives the fluid from the auxiliary lubrication circuit, and the step of monitoring includes reading the second pressure subsequent to reading the first pressure.

19. The assembly of claim 17, wherein the primary lubrication circuit is defined between a first inlet of the lubricant valve and a first outlet of a primary pump that is in communication with a main lubricant reservoir, and the auxiliary lubrication circuit is defined between a second inlet of the lubricant valve and a branched path, the branched path merging a second outlet of an auxiliary pump and a third outlet of a windmill pump into the auxiliary lubrication circuit.

* * * * *